Feb. 11, 1964     O. NIEPMANN     3,120,729
MEANS FOR CARTRIDGING PLASTIC MASSES, ESPECIALLY EXPLOSIVE MASSES
Filed Sept. 19, 1960     7 Sheets-Sheet 1
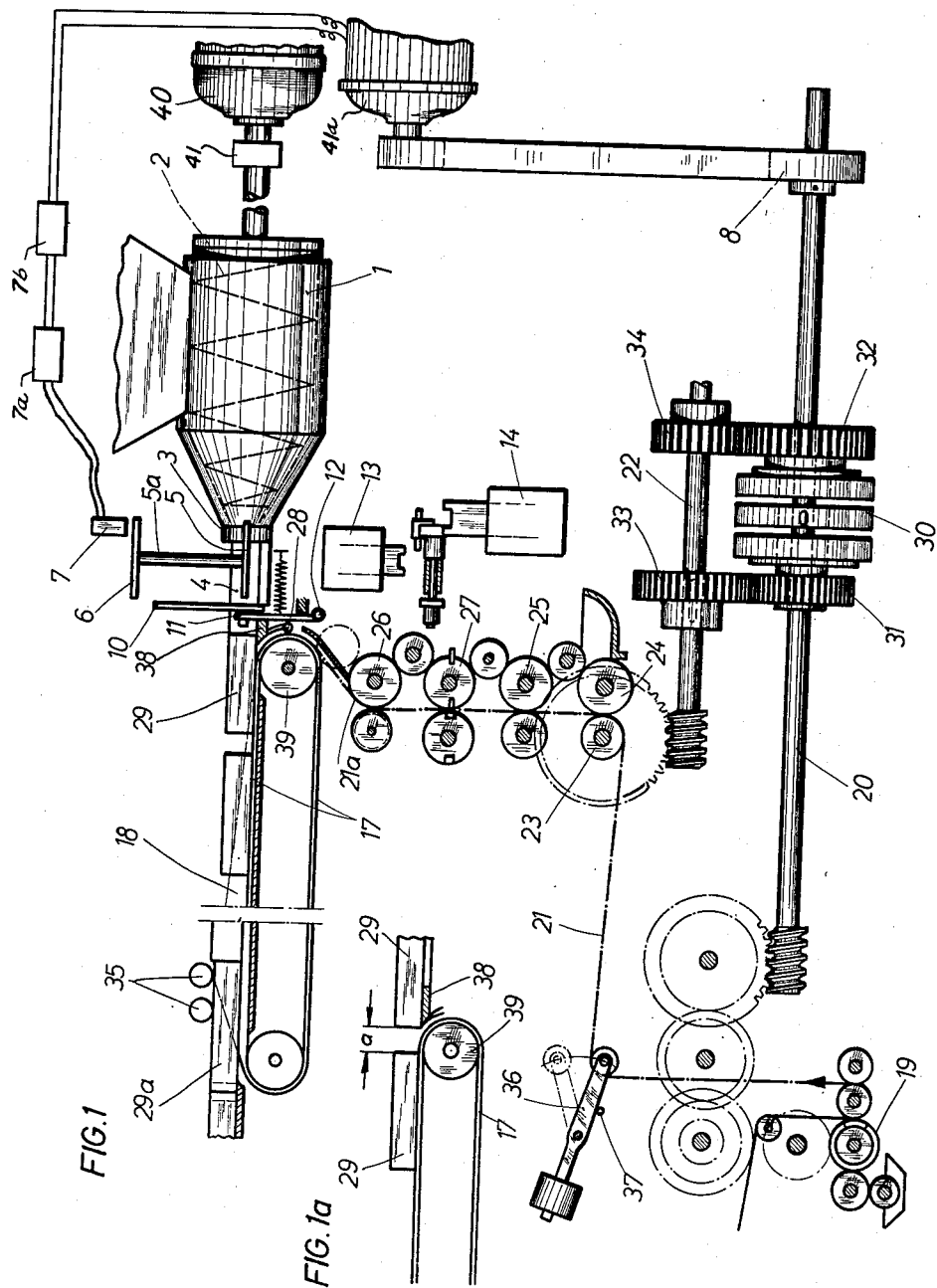
INVENTOR.
Otto Niepmann
BY Feb. 11, 1964  O. NIEPMANN  3,120,729
MEANS FOR CARTRIDGING PLASTIC MASSES, ESPECIALLY EXPLOSIVE MASSES
Filed Sept. 19, 1960  7 Sheets-Sheet 2
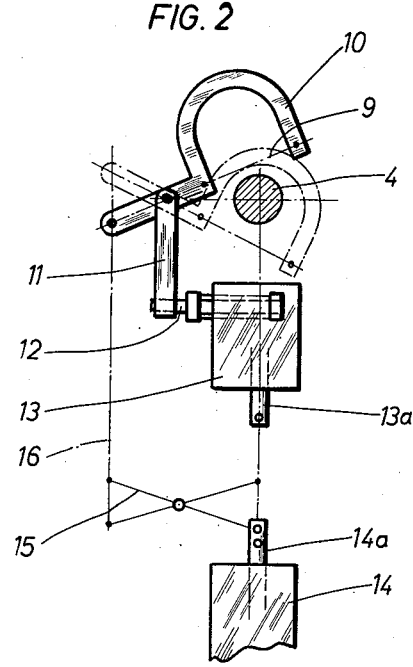
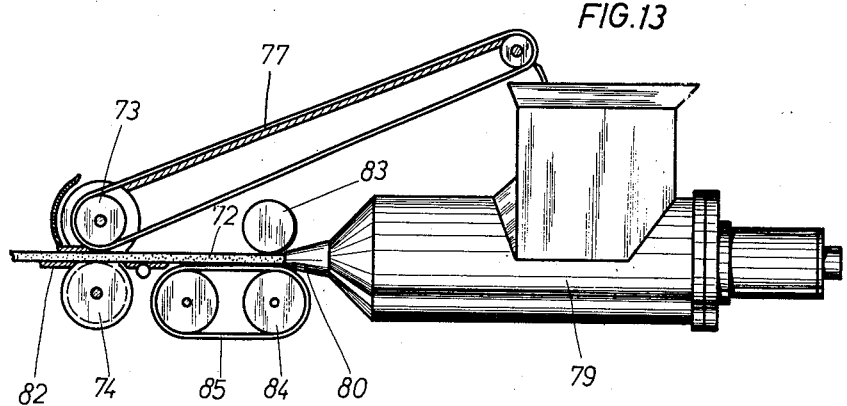
INVENTOR.
Otto Niepmann
BY

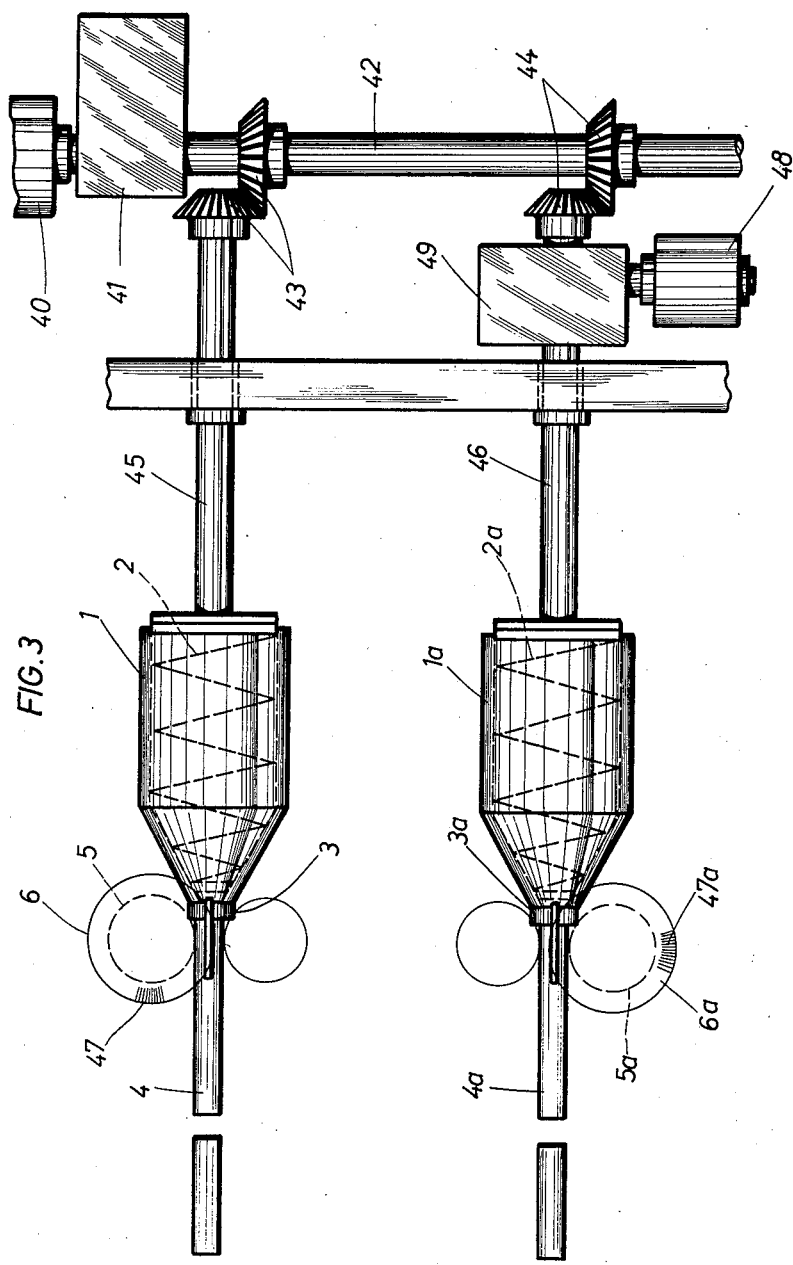

Feb. 11, 1964   O. NIEPMANN   3,120,729
MEANS FOR CARTRIDGING PLASTIC MASSES, ESPECIALLY EXPLOSIVE MASSES
Filed Sept. 19, 1960   7 Sheets-Sheet 4

INVENTOR.
Otto Niepmann
BY

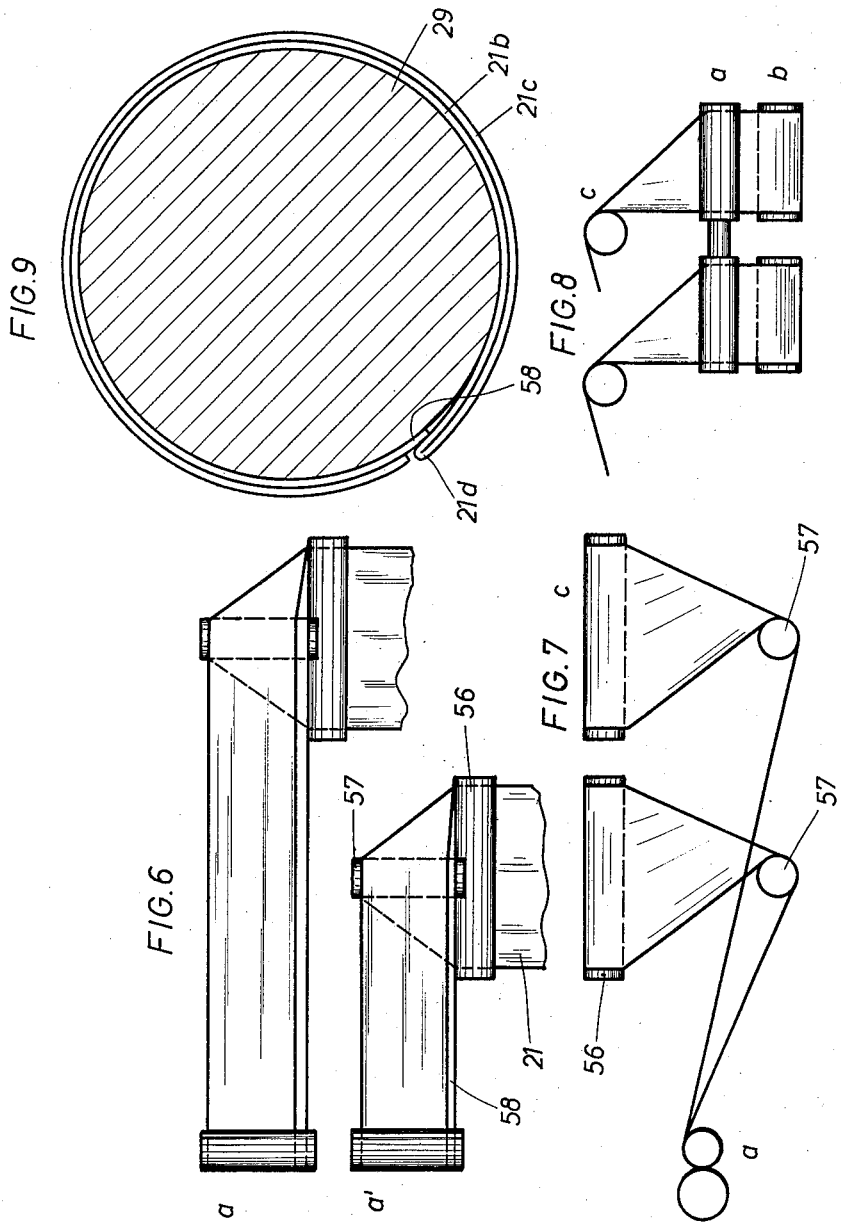

Feb. 11, 1964     O. NIEPMANN     3,120,729
MEANS FOR CARTRIDGING PLASTIC MASSES, ESPECIALLY EXPLOSIVE MASSES
Filed Sept. 19, 1960     7 Sheets-Sheet 6
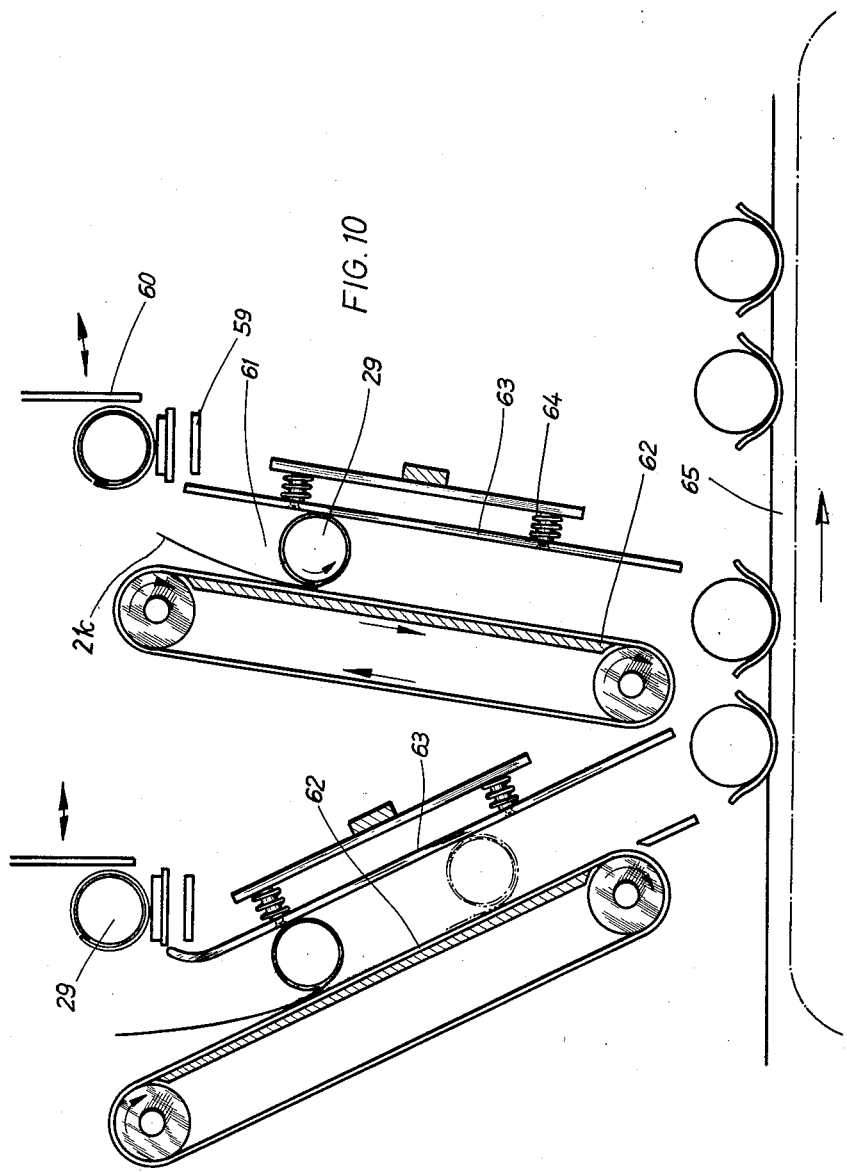
INVENTOR.
Otto Niepmann
BY Feb. 11, 1964        O. NIEPMANN        3,120,729

MEANS FOR CARTRIDGING PLASTIC MASSES, ESPECIALLY EXPLOSIVE MASSES

Filed Sept. 19, 1960        7 Sheets-Sheet 7

INVENTOR.
Otto Niepmann
BY

United States Patent Office 3,120,729
Patented Feb. 11, 1964

3,120,729
MEANS FOR CARTRIDGING PLASTIC MASSES, ESPECIALLY EXPLOSIVE MASSES
Otto Niepmann, Gevelsberg, Westphalia, Germany, assignor to Fr. Niepmann & Co., Gevelsberg, Westphalia, Germany
Filed Sept. 19, 1960, Ser. No. 56,853
12 Claims. (Cl. 53—64)

The present invention relates to a machine for covering plastic masses, especially explosives, in cylindrical form with an envelope of paper or similar material, as for instance transparent cellulose foils or the like.

Heretofore it was customary to this end to employ envelopes closed at one end and to fill the explosive into such envelopes. This type of packing explosives, however, is awkward and cumbersome because the corresponding filling machines can operate only stepwise.

It is furthermore known to cut parallel strands from a band-like strip and to cover such strips by paper. This method has the drawback that the strands which have a rectangular or square cross section have to be transformed so as to obtain a circular cross section so that a considerably longer machine is required.

It is, therefore, an object of the present invention to provide a machine for covering plastic masses, especially explosives, in cylindrical form with an envelope of paper or the like, which will overcome the above mentioned drawbacks.

It is another object of this invention to provide a machine of the above mentioned type, which will make it possible to control the machine so that the fed packing paper or the like can be fed synchronously with the strand of explosive.

It is also an object of this invention to provide a machine for the above mentioned purpose, which will make it possible to feed a plurality of strands of explosives alongside each other.

These and other objects and advantages of the invention will appear more clearly from the following specification in connection with the accompanying drawings, in which:

FIG. 1 is a diagrammatic side view of a machine according to the present invention.

FIG. 1a shows the cut-off strand section in a somewhat different position from that of FIG. 1.

FIG. 2 is a section through the cut-off device for the strand.

FIG. 3 is a top view of two supply containers arranged alongside each other.

FIG. 6 is a top view of a folding station for the paper web.

FIG. 7 is a side view of FIG. 6.

FIG. 8 is a front view of FIG. 6.

FIG. 9 illustrates a cross section through a cartridge with double-fold.

FIG. 10 is a cross section through a winding compartment or winding station.

FIG. 13 illustrates partly in section and partly in view a modified feeding system.

*General Arrangement*

Figure 4:
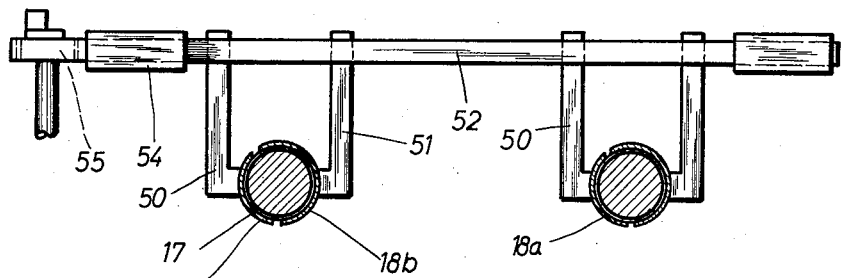
FIG. 4 is a section taken along the line IV—IV of FIG. 5.

The method according to the present invention for cartridging plastic masses, especially explosives, is characterized primarily in that a strand in round shape prior to the feeding of the enveloping material is cut into pieces in a continuous manner and the cut-off pieces or cartridges are spaced with regard to each other and enveloped while the enveloping material is fed synchronously with the speed of said strand.

A machine according to the invention for carrying out said method comprises a storage container having a mouth piece and being equipped with a worm while adjacent said mouth piece there is arranged a driving system for a perforated disc or the like adapted to be affected by the explosive strand. By means of an electric cell, said perforated disc is adapted to control the voltage of the drive motor (direct current-synchronous motor) of the machine synchronously with regard to the feed of the explosive strand. This arrangement makes it possible to control the machine so that the fed wrapping paper or the like can be supplied synchronously with the explosive strand. This is of great importance because no worms can uniformly feed a plastic material.

According to a further feature of the present invention, the feeding of the paper is effected by two feeding units of which the first one always pulls off the same paper length from a bobbin, whereas the second feeding unit operates through the intervention of a magnetic reversing gear or reversing coupling at two different speeds.

For the purpose of separating the individual cartridges, there is provided a separating wire between the mouth piece and a conveyor belt, said wire being clamped into a yoke. The said separating wire is adjustable by electromagnets or the like. The conveyor belt which conveys the fed paper web and the cut-off cartridge is passed through the folding sleeve for forming the envelope.

A machine according to the present invention may be equipped with a plurality of supply containers and accordingly may be designed so as to have a plurality of strands moving alongside each other. In such an instance, the driving motors for the second and additional worms will be controlled through the intervention of discs driven by the oncoming strands and are furthermore controlled by photoelectric cells and frequency proportional voltages by comparative measurements in a synchronous manner with regard to the first worm so that each storage container will in the same time unit deliver the same number of cartridges.

In order to prevent a cartridge, particularly of explosives, from being deformed easily, a double envelope for the the cartridge is desired. To this end, according to the present invention, the paper blank may be folded in the longuitudinal direction of the cartridge and in this condition be conveyed to the cartridge leaving the mouth piece. After the cartridge has passed through the folding sleeve, it will be rolled about its longitudinal axis so that one portion of the blank will first be rolled off and subsequently will be wound about the other part already folded around the cartridge. To this end, a folding device for the paper web may be arranged ahead of the first feeding unit. This folding device comprises folding rollers or the like offset with regard to each other by 90°. Adjacent the conveyor path there is arranged a chute or path one side of which is formed by the conveyor belt whereas the other side is formed by a cushioned sheet metal member.

The present invention starts with a strand which may be discharged for instance from a mouth piece of a worm feeder. For purposes of forming the mass strands, however, also profiled rollers may be provided to which a floss is fed. These profiled rollers are operatively associated with conveyor belts which return those rolled portions of the floss which have not been formed to a round strand. These returned portions will then be again employed for forming a floss. If desired, a plurality of rollers may be employed for forming the floss. However, instead thereof also a feeder worm installation with a corresponding mouth piece may be employed.

Structural Arrangement

Referring now to the drawings in detail, the arrangement shown in FIG. 1 comprises a container 1 to be filled with an explosive. In container 1 there is arranged a conveyor worm 2 by means of which the explosive is pressed out through a mouth piece 3. This mouth piece 3 has a circular cross section. The worm 2 is rotated by a separate motor 40 (FIG. 3) having associated therewith a stepless transmission 41 so that the delivery of the worm may be varied in conformity with the respective requirements. The explosive strand 4 leaving the mouth piece 3 actuates a disc 5 and a perforated disc 6 or the like connected to disc 5. Above the perforation circle of disc 6 there is a photoelectric cell 7. The impulses of the photoelectric cell which occur when the perforated disc rotates will increase or reduce the voltage for a separate motor 40a (FIG. 1) and thereby the speed of such motor. This means that the speed of the motor 40a and the speed of the explosive strand 4 leaving the mouth piece 3 will be synchronous. This motor, 40a, through the intervention of a pulley 8 drives the paper withdrawing means. In this way, the paper feed will operate synchronously with the explosive strand leaving the mouth piece 3.

Adjacent the mouth piece 3, there is provided a cutting or separating device by means of which the explosive strand will be cut to the desired length of the cartridge. This separating device consists of a wire 9 (see FIG. 2) which is clamped into a yoke 10. Yoke 10 is journalled on a lever 11 which is adapted to be tilted on a horizontal shaft 12 located perpendicularly to the strand 4. The separating operation itself will be actuated by electromagnets 13 and 14 in order to obtain as short a separating time as possible because the explosive strand is to be separated during its passage. The two magnet armatures 13a and 14a act upon a double lever 15 which by means of joints and a rod 16 is connected to yoke 10. Inasmuch as yoke 10 is rotatably mounted on shaft 12, said yoke can follow the explosive strand until the separation has been completed so that an approximately straight cut will be obtained. By means of a spring not shown in the drawing, yoke 10 will be returned against an abutment.

Figure 5:
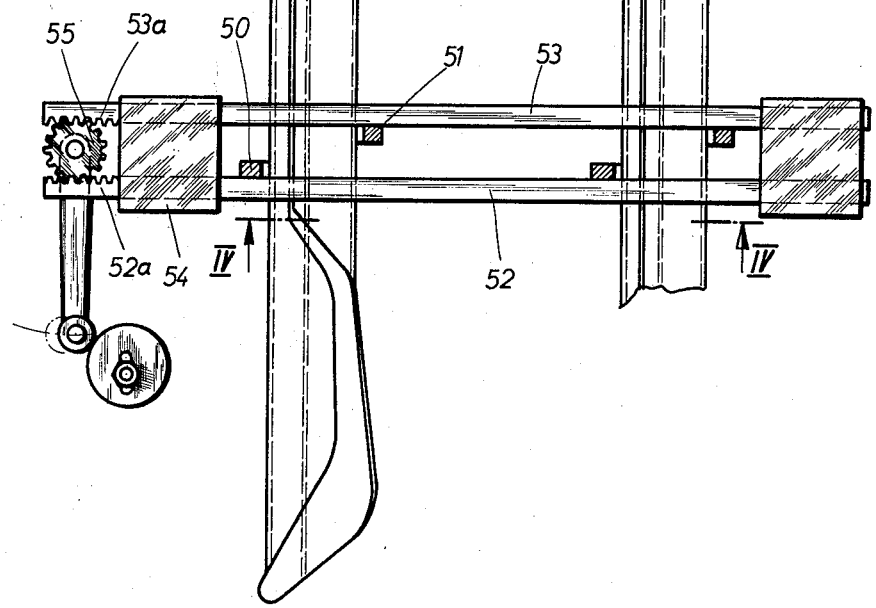
FIG. 5 is a top view of the folding sleeves shown in section in FIG. 4.

The paper or other wrapping material, as for instance a transparent cellulose foil or the like, is from a bobbin (not illustrated) fed by two devices to the conveyor belt 17 and a folding sleeve 18. According to FIGS. 4 and 5, the folding sleeves may be divided and may consist of the two parts 18a and 18b. These two parts are arranged on a holder 50, 51. Holder 50 is connected to a rail 52, whereas the holder 51 is connected to a rail 53. These rails are held in bearings 54. At the end of the rails there is provided a gear system 52a, 53a meshing with a gear 55. This gear 55 is adapted by means of an eccentric (not shown in the drawing) to be turned back and forth so that the rails 52 and 53 will carry out a fast back and forth movement. The extent of this movement is only very small and adjustable. This back and forth movement of rails 52 and 53 brings about an opening and closing of the two halves 18a and 18b of the folding sleeve. On its way between the mouth piece 3 and sleeve 18, the separated cartridges 29 may swell somewhat and deform, above all when the machine is turned off for a short period. The vibration of the sleeve halves 18a and 18b imparts upon the cartridges a round shape and the precise diameter and at the same time reduces the friction of belt 17 in the sleeve.

The first winding off device of the paper web 21 has associated therewith a roller 19 and is driven by shaft 20 (FIG. 1). This shaft 20 always retains the speed determined by the motor and the pulley 8. Where roller 19 rotates, such a quantity of paper is withdrawn as corresponds to the length of the cartridge including the two paper covers.

The paper web 21 is fed by a second winding off device which is driven by shaft 22. Roller 23 during one rotation withdraws the length of the cartridge. The second winding off device has a guiding roller 24 with two feeding roller pairs 25, 26. Between these two roller pairs 25 and 26 there is provided a circulating cutting device 27. The second feeding roller pair 26 then conveys the separated paper cut or blank 21 to the conveyor rollers 28 which convey the paper cut to belt 17 where the cut off cartridge 29 moves onto the paper cut or blank.

The drive of the winding off device is effected in the following manner. Mounted on shaft 20, which is drivingly connected to a drive motor, is an electromagnetic reversing coupling 30 having mounted gears 31 and 32 on the freely running coupling halves. These gears 31 and 32 mesh with gears 33 and 34 on shaft 22. When gear 31 drives gear 33, shafts 20 and 22 rotate at the motor speed. If, however, gear 32 drives gear 34, shaft 20 will rotate at motor speed while shaft 22 will rotate faster in conformity with the respective transmission ratio.

Belt 17 moves synchronously with the said second winding off device. It passes through the folding sleeve 18 the inner diameter of which corresponds to the explosive strand diameter and furthermore to twice the thickness of belt 17. The width of belt 17 corresponds to the circumference of the explosive cartridge. Belt 17 pulls the paper cut or blank 21 with the cartridge piece thereon through the folding sleeve 18 so that the explosive will be enveloped and the glue seam will be closed. Rollers 35 arranged adjacent the folding sleeve 18 press once more upon the glue seam. The enveloped cartridges 29a will then finally be conveyed to a device in which the end folding of the wrapping will be carried out.

Operation

It may be assumed that the circumference of disc 5 corresponds to the desired cartridge length. The transmission of the drive motor for the winding off device is such that one rotation of disc 5 corresponds to one rotation of roller 19 and similarly to one rotation of the withdrawing roller 23. When disc 5 has turned once, i.e. has wound off a length of a cartridge, the shaft of roller 19 has turned likewise once and releases a precisely adjustable contact, whereby magnets 13 or 14 will become responsive so that yoke 10 will by means of the clamped in wire 9 cut the explosive strand.

At the same time, that coupling part of the reversing coupling 30 is attracted on which is arranged gear 32 whereby the faster transmission will be made effective. The second winding off device which is driven through the intervention of shaft 22 will, however, run faster until a pendulum lever 36 will abut an abutment 37. This means that the paper length fed by the first winding off mechanism (two times paper cover) will be caught up with by the second winding off mechanism. The cut off piece of the explosive strand will now be spaced from the succeeding explosive strand portion leaving mouth piece 3 by a distance a (FIG. 1a). This distance a corresponds to twice the paper overlap. The succeeding explosive strand leaving the above mentioned mouth piece has moved on on guiding sheet 38 up to close to the belt roller 39 (FIG. 1a). As soon as the pendulum lever 36 abuts abutment 37, it will release a contact, the fast traverse movement of the second winding off device will be stopped, and the normal transmission will be made effective through the intervention of gears 31 and 33. This means that the paper of the second winding off device and the belt 17 will again move synchronously with the not yet severed explosive strand 4.

FIG. 3 illustrates that in addition to the explosive receiving container 1 there is a second container 1a. If desired, there may also be still further containers. The operation is effected by a motor 40 through a reversing gear 41 to shaft 42 and from the latter through pairs of bevel gears 43 and 44 to shaft 45 of worm 2 and further to shaft 46 of worm 2a.

The explosive strand 4 leaving the mouth piece 3 actuates for instance disc 5 connected to disc 6. Similarly, the strand 4a leaving the mouth piece 3a drives a disc 5a with a disc 6a. The discs 6 and 6a are provided with as many markings 47 and 47a as possible along their circumference. Above each of the discs 6 and 6a there is arranged a photoelectric cell 7. By means of the impulses of the cell as they are produced when discs 6 and 6a rotate, frequency proportional voltages are produced. The voltage produced by disc 6 through the intervention of the respective photoelectric cell and an amplifier is conveyed to motor 40a which drives pulley 8, and the voltage produced by disc 6a is conveyed to a control motor 48 (direct current synchronous motor) which acts upon the control means of a variable speed control transmission 49 mounted in the drive for the worm 2a. This control motor 48 or, when providing more than two worms, further corresponding control motors with control transmission, are controlled by comparative measurements of the voltages which are produced by discs 6 and 6a through photoelectric cells and amplifiers. This control is such that the exit speed of the plastic mass from mouth piece 3 always substantially equals the exit speed from the mouth piece 3a.

In order to wrap an explosive cartridge twice with paper, a correspondingly long paper section or paper cut may be supplied. This, however, has the drawback that when employing machines with a plurality of paths, a relatively wide intermediate space has to be provided between the individual strands. In order to cut down the distance between these individual working paths, according to the present invention the wrapping paper section or cut is fed to the strand in double folded condition, is provided with adhesive and is conveyed to the enveloping sleeve. Such a folding device for the paper web is illustrated in FIGS. 6 to 8 and, more specifically, for a two-paths machine. The paper web 21 passes over a roller 56 and from the latter to a roller 57 which is offset by 90° relative to and arranged below or above roller 56. In this way, it is possible to fold the paper web twice. As will be evident from FIG. 6, the folding is carried out in such a way that one portion of the paper web will protrude somewhat beyond the other portion so that a narrow margin 58 will be obtained. This is due to the fact that the narrower portion of the paper web must equal the circumference of the web—2 millimeters (see FIG. 9), and the wider portion must equal the circumference of the envelope plus overlap. This folded paper web will then be processed in the same manner as has been described in connection with FIG. 1.

When leaving the enveloping sleeve 13, this double folded cut will be located around the cartridge in the manner shown in FIG. 9. Directly upon the cartridge will be located the portion 21b with the overlap 58. This overlap is provided with an adhesive so that its inner portio ncan be glued. The outer part 21c is located around said part 21b, however, with the folding edge 21d.

After the cartridge has left the folding sleeve 18, it will by means of a further conveyor belt 59 pass into the range of an oscillating lever 60 which throws the cartridge 29 into a chute 61. One wall of chute 61 is formed by a conveyor belt 62 which passes through the chute in the direction from the top to the bottom. The other side of the chute is formed by a sheet metal member 63 which is under the load of a spring 64. When throwing the cartridge 29 into chute 61, the outer part 21c of the paper cut will first be rolled off and while the cartridge passes further through the chute, this portion of the paper cut will be wrapped around the cartridge so that the desired double wrapping will be obtained. In order to assure a smooth engagement of the paper cut on the cartridge, adhesive may be applied onto the free standing portions of the wrapping by an adhesive spotter prior to the cartridge being moved into the chute 61. The ready wrapped cartridge is then conveyed to a conveyor belt 65 which passes the cartridges to a device carrying out in a manner known per se the folding at the end face.

Figure 11:
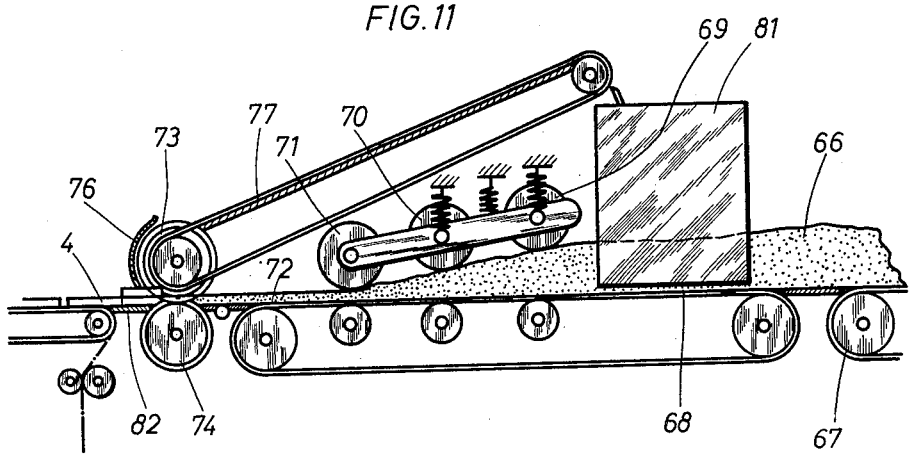
FIG. 11 represents a side view of a feeding device for the explosive.

FIGS. 1 and 3 illustrate that the strand 4 leaves a housing by means of a worm. It is, of course, also possible to form the strand in a different way. FIG. 11 illustrates that the mass 66 to be wrapped may by means of a conveyor belt 67 be passed to a second conveyor belt 68. Conveyor belt 67 moves faster than conveyor belt 68 so that the newly deposited mass will in a dense manner (without gaps) be pressed against the mass on the conveyor belt 68. Above said conveyor belt 68 there are mounted for instance three rollers 69, 70 and 71 which roll the mass to a floss 72. The roller 71 is adjustable as to height. The rollers 70 and 69 are resiliently journalled and are tiltable about the shaft of roller 71 in order to assure a trouble-free rolling out of the mass. When employing one roller only, it is possible that the mass may build up in front thereof and will not be rolled out any longer. For purposes of laterally confining the mass, sheet metal members 81 may be provided guiding the mass toward the central portion so that a unilateral rolling out will be avoided. The floss 72 is conveyed to two profiled rollers 73 and 74 which at their points of contact form a circle 75 corresponding to the diameter of the cartridge. By means of these rollers the corresponding strand will be squeezed off. Those portions of the floss which remain between the formed strands will by means of a guiding panel 76 be conveyed to a conveyor belt 77 and again passed to the mass. The said panel 76 may simultaneously be designed as scraper or doctor blade. Such a device for forming a strand is particularly advantageous for use in connection with high explosive explosives in connection with which conveyor worms are preferably avoided.

To facilitate the return of the not used portions of the floss, it is possible between the individual profiled portions 73a of rollers 73 to provide cutting discs 78 which cut up the individual webs of the floss and increase the friction required for carrying the same away. Adjacent the profiles of the rollers 73 and 74 there are provided mouth pieces 82 which are adapted simultaneously to act as scraper.

The strand 4 leaving the mouth pieces will then be conveyed to a device according to FIG. 1.

Figure 12:
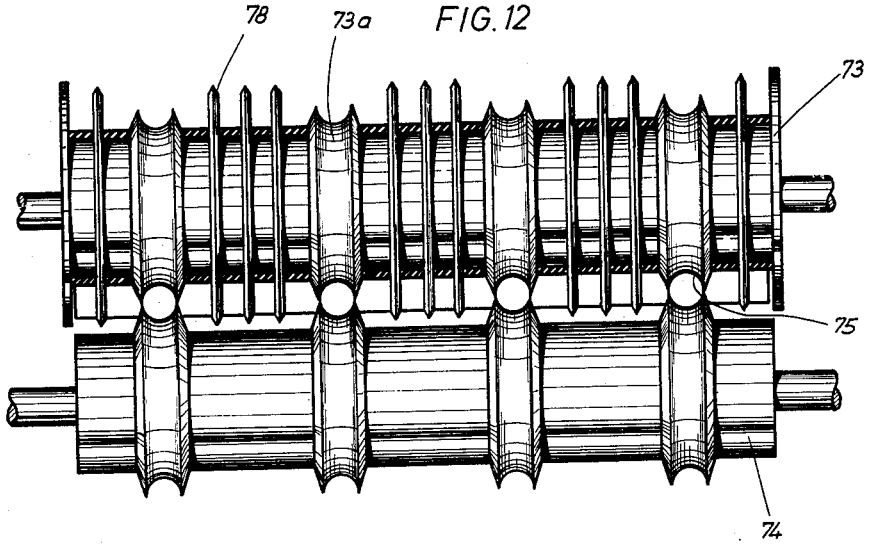
FIG. 12 illustrates profiled rollers for the feeding device.

According to FIG. 13, the floss 72 may also be produced by means of a device in which in a housing 79 a worm (not illustrated) is arranged while the housing is equipped with a mouth piece 80 corresponding approximately to the cross section of the desired floss. By means of rollers 83, 84, the floss is then rolled to size and is by belt 85 conveyed to a profiled roller 73, 74 in conformity with FIGS. 11 and 12.

It is, of course, to be understood that the present invention is, by no means, limited to the particular constructions shown in the drawings but also comprises any modifications within the scope of the appended claims.

What I claim is:

1. In a machine for cartridging plastic masses, especially explosives: advancing means including variable speed drive means for advancing a strand of the plastic mass to be cartridged, perforated disc means rotatable by the plastic strand being advanced by said advancing means, a photoelectric cell controlled by said perforated disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the advance of the strand of plastic mass to be cartridged, means to cut the strand in uniform lengths, a conveyor to receive the cut off lengths and also to receive the wrapping material, each said length being advanced by said conveyor so as to be spaced from the next following length.

2. In a machine for cartridging plastic masses, especially explosives: a strand-cutting device, feeding means including a variable speed drive means for feeding a strand of the plastic mass to be cartridged to said cutting device, perforated disc means rotatable by the plastic strand being advanced by said feeding means, photoelectric cell means controlled by said perforated disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the feeding of the strand of plastic mass to be cartridged to said cutting device, said cutting device comprising a yoke and a cutting wire supported thereby, means tiltably supporting said yoke to permit limited tilting movement of said yoke about an axis substantially perpendicular to the direction of feeding of the strand to be cartridged, and conveyor means arranged adjacent said cutting device for conveying sections cut off from said strand by said cutting device, said conveyor means being operable to space each section from the next following section, said wrapping material advancing means being arranged to deliver lengths of wrapping material to said conveyor means so the said sections are centered thereon.

3. In a machine for cartridging plastic masses, especially explosives: a strand-cutting device, feeding means including a variable speed drive means for feeding a strand of the plastic mass to be cartridged to said cutting device, perforated disc means rotatable by the plastic strand being advanced by said feeding means, photoelectric cell means controlled by said perforated disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the feeding of the strand of plastic mass to be cartridged to said cutting device, said cutting device comprising a yoke and a cutting wire supported thereby, means tiltably supporting said yoke to permit limited tilting movement of said yoke about an axis substantially perpendicular to the direction of feeding of the strand to be cartridged, conveyor means arranged adjacent said cutting device for conveying sections cut off from said strand by said cutting device, said conveyor means being operable to space each section from the next following section, said wrapping material advancing means being arranged to deliver lengths of wrapping material to said conveyor means so the said sections are centered thereon and a folding sleeve surrounding portions of said conveyor means and comprising a plurality of portions radially displaceable relative to each other for forming the wrapping material around said plastic mass.

4. In a machine for cartridging plastic masses, especially explosives: a plurality of containers for receiving the material to be cartridged, a plurality of feeding means respectively associated with said containers for advancing material from said containers in form of strands, a plurality of perforated disc means respectively associated with said feeding means and operable by the respective strands being advanced by said feeding means, a plurality of photoelectric cells associated with said disc means and controlled thereby, said photoelectric cells being electrically connected to all but one of said feeding means, means respectively associated with said photoelectric cells and the last mentioned said feeding means for maintaining the operation of the last mentioned said feeding means substantially synchronous with the operation of said one feeding means.

5. In a machine for cartridging plastic masses, especially explosives: advancing means including a variable speed drive means for advancing a strand of the plastic mass to be cartridged, perforated disc means rotatable by the plastic strand being advanced by said advancing means, a photoelectric cell controlled by said perforated disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the advance of the plastic material to be cartridged, cutting means receiving the strand advanced by said advancing means for cutting off sections from said strand, conveyor means adjacent said cutting means for receiving and conveying said cut-off sections, said wrapping material advancing means being operable to withdraw wrapping paper from a bobbin and to feed the wrapping paper to said conveyor means for wrapping the paper around cut-off strand sections, said wrapping paper feeding means comprising a first feeding unit and a second feeding unit and also comprising first means for actuating said first unit operating at substantially a constant speed whereby said first unit is operable always to withdraw the same length of wrapping paper, and means for actuating said second unit including a magnetic shiftable clutch with two different speeds to thereby permit said second unit to operate at a first speed equal to the speed of said first unit and at a second speed greater than the speed of said first unit.

6. An arrangement according to claim 5, which includes a folding device arranged ahead of said first feeding unit for foldnig the wrapping paper in the direction of its length prior to its movement to said conveyor means, said folding device including folding roller means offset to each other by substantially 90°.

7. In a machine for cartridging plastic masses, especially explosives: advancing means including a variable speed drive means for advancing a strand of the plastic mass to be cartridged, perforated disc means rotatable by the plastic strand being advanced by said advancing means, photoelectric cell means controlled by said perforated disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the advance of the plastic material to be cartridged, cutting means arranged adjacent the path of movement of the plastic strand being advanced for cutting off therefrom sections in conformity with the length of the cartridge to be produced, first conveyor means for receiving the cut-off strand sections and for spacing said sections apart, said wrapping material advancing means being operable for feeding two-ply wrapping paper sections to said first conveyor means, folding sleeve means surrounding at least portions of said first conveyor means and the strand sections supported thereby operable to form said two-ply wrapping paper sections around the strand sections, and chute means arranged adjacent said first conveyor means and formed partly by second conveyor means and partly by resiliently mounted wall means and operable to unwind the outer ply of wrapping from each strand section and to wrap it about the strand section in the opposite direction to give the strand section a double layer spiral wrapping.

8. In a machine for cartridging plastic masses, especially explosives: container means for receiving the plastic mass to be cartridged, first roller means arranged adjacent said container means for receiving plastic masses therefrom and rolling the same to a floss, second roller means receiving said floss for rolling the same into strands of substantially circular cross section, first conveyor means arranged adjacent said second roller means for returning excessive material to said container means, advancing means including variable speed drive means for advancing the strands of plastic masses to be cartridged, perforated disc means rotatable by the plastic strands being advanced by said advancing means, photoelectric cell means controlled by said disc means, wrapping material advancing means to advance material to wrap said strand, an electric motor driving said wrapping material advancing means, and means electrically connecting said photoelectric cell to said electric motor for varying the speed thereof to thereby control the latter for operation of said wrapping material advancing means in synchronism with the advance of the plastic material to be cartridged, cutting means for cutting off sections from said strands, and means for wrapping the wrapping material around said strands.

9. An arrangement according to claim 8, in which said second roller means are designed as profiled rollers equipped with cutting discs between the profiled portions of said profiled rollers for separating floss portions into separate strands.

10. An arrangement according to claim 8, in which said first roller means for forming the floss comprise a plurality of rollers.

11. An arrangement according to claim 8, in which said first roller means for forming the floss comprise a plurality of rollers and means resiliently supporting said rollers.

12. An arrangement according to claim 8, in which said first roller means for forming said floss comprise a plurality of rollers serially arranged with regard to each other, at least the last one of said rollers when looking in the direction of movement of the plastic mass by said rollers being adjustable.

References Cited in the file of this patent

UNITED STATES PATENTS

| | | |
|---|---|---|
| 1,001,230 | Sullivan | Aug. 22, 1911 |
| 1,810,864 | Vogt | June 16, 1931 |
| 2,384,494 | Schutter | Sept. 11, 1945 |
| 2,578,626 | Brandenberger | Dec. 11, 1951 |
| 2,735,378 | Vogt | Feb. 21, 1956 |
| 2,883,811 | Ostern | Apr. 28, 1959 |
| 3,007,399 | Sasaki et al. | Nov. 7, 1961 |